(12) United States Patent
Hess et al.

(10) Patent No.: US 6,600,964 B2
(45) Date of Patent: Jul. 29, 2003

(54) METHOD FOR CONTROLLING TECHNICAL PROCESSES

(75) Inventors: Karl Hess, Lichtenau (DE); Tino Heber, Freiberg (DE); Wolfgang Horn, Hohenstein-Ernstthal (DE); Steffen Kirste, Chemnitz (DE); Norbert Kosel, Chemnitz (DE)

(73) Assignee: Siemens Aktiengesellschaft (DE)

( * ) Notice: Subject to any disclaimer, the term of this patent is extended or adjusted under 35 U.S.C. 154(b) by 106 days.

(21) Appl. No.: 09/860,072

(22) Filed: May 17, 2001

(65) Prior Publication Data

US 2001/0037161 A1 Nov. 1, 2001

Related U.S. Application Data

(63) Continuation of application No. PCT/DE99/03550, filed on Nov. 5, 1999.

(30) Foreign Application Priority Data

Nov. 18, 1998 (DE) .......................... 198 53 205

(51) Int. Cl.⁷ ............................... G06F 19/00

(52) U.S. Cl. ...................... 700/97; 700/86; 700/103

(58) Field of Search ................ 700/97, 103, 104, 700/26, 86, 181; 717/101, 102, 104, 120, 121

(56) References Cited

U.S. PATENT DOCUMENTS

| | | | |
|---|---|---|---|
| 5,168,441 A | 12/1992 | Onarheim et al. | 364/146 |
| 5,453,933 A | 9/1995 | Wright et al. | 364/474.23 |
| 5,576,946 A | 11/1996 | Bender et al. | 364/146 |
| 6,272,672 B1 * | 8/2001 | Conway | 717/1 |

FOREIGN PATENT DOCUMENTS

| | | |
|---|---|---|
| DE | 69121712 | 3/1993 |
| DE | 19513230 | 10/1996 |
| DE | 19740550 | 4/1998 |
| EP | 0819272 | 1/1998 |
| EP | 0829801 | 3/1998 |
| WO | 9106050 | 5/1991 |
| WO | 9119237 | 12/1991 |

OTHER PUBLICATIONS

French article, "Les Objets, Avenir du Contrôle de Procédês", Solutions, Informatique Industrielle, *MESURES* 682, pp.81–83, Feb. 1996.
German article by Drews et al., "Leittechnisches Konzept für Zementwerke", *ELEKTRIE*, Berlin 47, pp.47–51, 1993.
Hilding Elmquist, "A Uniform Architecture for Distributed Automation", *Advances in Instrumentation and Control*, pp.1599–1608, 1991.
Das Prozessleitsystem SIMATIC PCS 7 von Siemens, Automatisierungstechnische Praxis 40 (1998).

* cited by examiner

*Primary Examiner*—Paul P. Gordon
(74) *Attorney, Agent, or Firm*—Baker Botts LLP

(57) ABSTRACT

Due to the diversity of the requirements to be met for controlling the movement of production machines, a system and method based on a range of hardware modules, which are provided with adequate computing capacity, a real-time operating system and specific basic functionality, a network (for example Profibus) for constructing a decentralized system with distributed control functionality and also operating and monitoring units with planned interfaces is disclosed. The invention comprises a configurable, distributable and programmable control software system for individually adapting the control solution to the client's requirements, with which the planned control solution is distributed among hardware modules and in which an engineering system used for management, configuration, programming, monitoring, debugging and commissioning.

8 Claims, 6 Drawing Sheets

METHOD FOR CONTROLLING TECHNICAL PROCESSES

This application is a continuation of PCT/DE99/03550 filed Nov. 5, 1999.

FIELD OF THE INVENTION

The present invention relates to a system and method for controlling technical processes. In particular, the present invention relates to a system and method for controlling the movement of production machines, where a central processor is used to run a control program which is based on an instantiation capability and an interconnection appropriate for the requirements of software components with predeterminable and at least parameterizable functionality.

BACKGROUND OF THE INVENTION

Previously known methods for automating technical processes are based either on a "stored-program controller functionality" or on a "CNC functionality." Since a certain functional scope is fixed within the framework of such functionalities, optimum adaptation to the requirements of a specific process is often possible only to a limited extent, since an entire group of functions is often superfluous in an actual application (for example, when a CNC controller actually designed for machine tools is used on packaging machines). Furthermore, single-purpose controllers designed individually with a view to the respective application exist in the form of specially programmed control software.

German Patent No. DE 197 40 550 discloses a method for the project planning and/or programming of a software application for controlling and/or monitoring a technical process and a device for controlling a technical process and/or for controlling the movement of a processing machine which runs a control program. This control program comprises a multiplicity of software modules. Process control functionalities of known stored-program controllers and known movement functionalities of NC controllers are realized in a uniform, configurable control system. Here, however, the individual software modules are respectively executed by a partial subgroup control, with the result that a central processor must be provided for each software module.

The reference WO 91 19237 and a document by Hilding Elmqvist entitled: "A Uniform Architecture For Distributed Automation" (Advances in Instrumentation and Control, U.S., Instrument Society of America, Research Triangle Park, Vol. 46, No. Part 02, Jan. 1, 1991 (01-01-1991), Pages 1599–1608, XP000347589 ISSN: 1054-0032) also disclose a graphic editing method for linking graphic objects and graphic modules for the programming of programs for controlling a technical process.

An article by Hajjar M N et al.: "LES OBJETS; AVENIR DU CONTROLE DE PROCÉDÉS" [Objects; The Future of Control Procedures] in MESURES REGULATION AUTOMATISME [Automation Control Measures], Fr, CFE. Paris, Vol. 60, No. 682, Feb. 1, 1996 (02-01-1996), Pages 81–83, XP000556561, ISSN: 0755-219X, outlines rudimentary properties of software objects in process engineering.

Thus, there exists a need for an improved system and method for controlling the movement of production machines.

SUMMARY OF THE INVENTION

The object of the present invention is to simplify the implementation of the control program and to reduce the number of necessary central processors.

This object is achieved by means of a system and method for the project planning or programming of a software application for controlling and/or monitoring an external technical process by providing instantiatable basic object types with addressable interfaces for parameterizing and interconnection, by providing at least one program processing object type for running a user-definable program and at least one driver object type for driving the process hardware as instantiatable basic object types and by the project planning, comprising at least the steps of selecting, parameterizing and interconnecting the basic objects.

The control program comprises software objects with addressable interfaces. For the project planning and programming of an actual software application, the project engineer/programmer chooses from a set of predefined basic object types, the basic object types required for the respective automation project. The selection of a basic object type corresponds within the framework of the project planning/programming to the instantiation of the corresponding basic object type. The respective instance of a basic object type is a basic object. The basic objects can be parameterized and interconnected by means of the interfaces of the basic objects, so that the basic objects respectively selected, as corresponding to the actual requirements, may be interconnected via their interfaces to form a control program and consequently finally form a software application for actual control functions.

Potentially suitable as basic object types are object types with basically predetermined functionality. A program processing object makes it possible to execute an actual sequence of instructions which can be predetermined by the respective user individually for each program processing object.

For driving the process hardware, the driver objects are provided, with different driver objects being respectively provided for different hardware components, even though, for purposes of simplicity, the following description refers only to driver objects.

According to the present invention, during the programming or project planning it is advantageously possible to select a basic object which can be parameterized and interconnected by means of the interfaces of the basic objects, so that the basic objects respectively selected, as corresponding to the actual requirements can be interconnected via their interfaces to form a control program and consequently finally form a software application for actual control functions.

At least one program processing object type (PPO) for the running of IAP sequences is advantageously provided as an instantiatable basic object type (BO). The program processing object type in this case represents a type of virtual machine.

For predetermining a command variable for a hardware subcomponent of the technical process, a command variable object type can also be advantageously provided as an instantiatable basic object type.

In addition, or alternatively, a feedback controller object can be provided as an instantiatable basic object type for controlling a hardware subcomponent of the external technical process.

The project planning/programming advantageously takes place on an engineering system, while the software application is executed on a runtime system. The project planning or programming is consequently independent of the execution of the respective actual software application.

The present invention covers not only the project planning/programming of a software application but also the respective actual software application planned/programmed according to an exemplary embodiment of the present invention, provided that the control and/or monitoring of the technical process takes place by means of a software application planned or programmed on the basis of the method in accordance with the present invention. The software application is distinguished by the basic objects respectively used and their actual interconnection.

BRIEF DESCRIPTION OF THE DRAWINGS

For a complete understanding of the present invention and the advantages thereof, reference is now made to the following description taken in conjunction with the accompanying drawings in which like reference numbers indicate like features, components and method steps.

DETAILED DESCRIPTION OF THE INVENTION

Each automation project is based on a range of hardware modules. In the case of a movement control system, which is used throughout this description for purposes of simplicity, there are single-axis, three-axes or four-axes modules with corresponding drives.

On the software side, a real-time operating system and additionally a network for constructing a decentralized control system with distributed control functionality is required for handling the events of the technical process, usually considered on an asynchronous processing basis.

Figure 1:
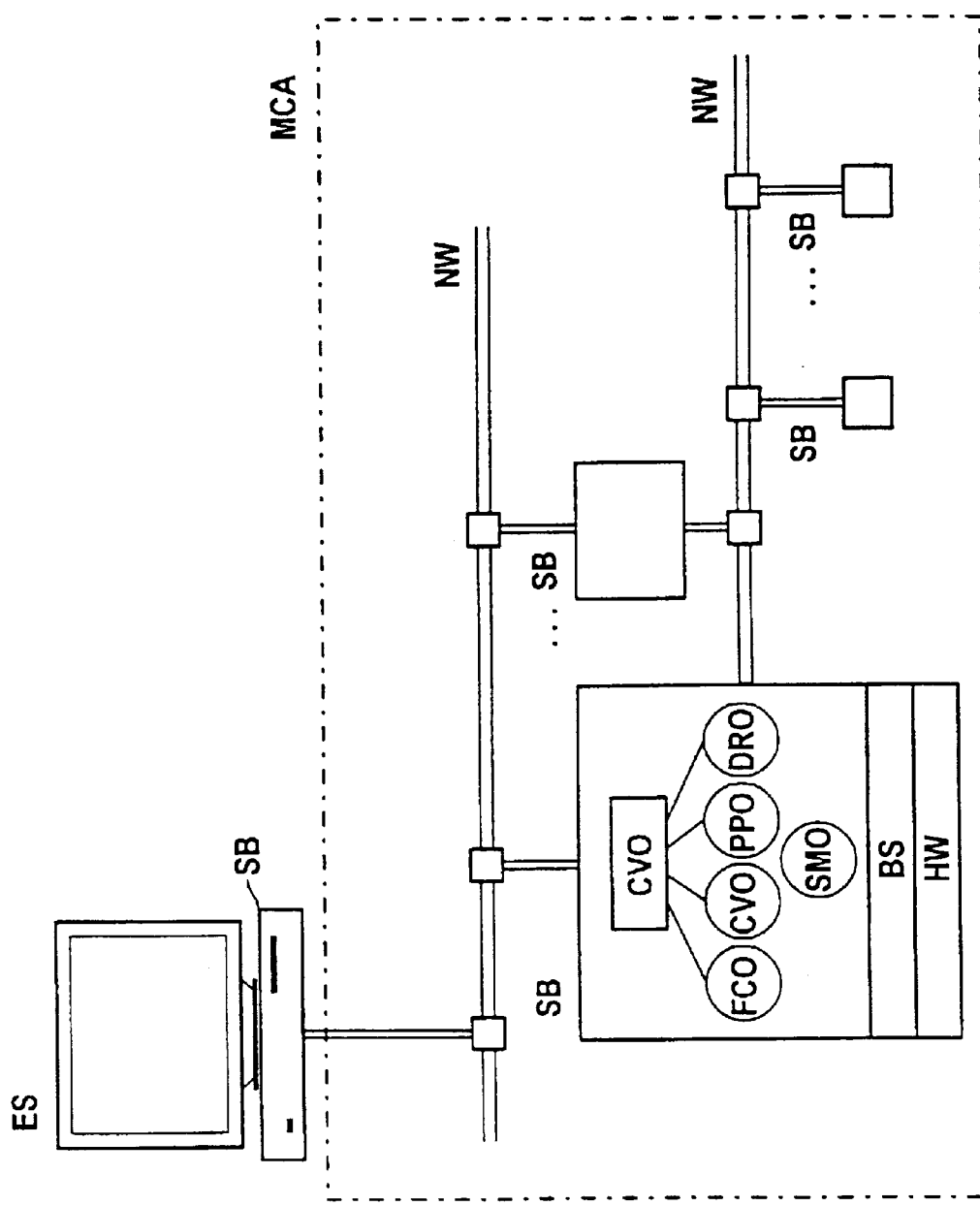
FIG. 1 illustrates an exemplary structure of a movement control application ("MC application") in accordance with an exemplary embodiment of the present invention.

Referring to the drawings, FIG. 1 illustrates a movement control software system, hereinafter "MC software system," comprising at least one engineering system ES (offline) and a runtime system RS (online). The ES is used by the user to create a movement control application, referred to hereinafter as "MC application" MCA. The RS executes the MCA. The creation of a MCA involves the system configuration, the creation of the user programs at the high-level language level and the transfer of this information into a form which can be executed internally in the RS (executable). The RS executes the executable.

Each hardware component used within the framework of the RS is referred to as a system module SB. The RS may comprise one or more system modules SB connected via a network NW. System modules SB are in this case process computers with dedicated peripherals, which may be personal computers, designed specifically for the control functionality, on which necessary and optional RS components run.

The engineering system ES runs on a programming unit or personal computer under a standard operating system. The ES has access to the RS for commissioning or testing the executable.

The actual control structure is produced by interconnecting what are known as basic objects BO which can be instantiated on the system modules SB, in accordance with FIG. 1 and are provided with differing functionality. Depending on the application, the basic objects BO can be distributed (instantiated) on system modules SB. Furthermore, each system module SB always has an operating system BS for access to the standard hardware HW.

In an exemplary embodiment, the basic objects BO are:

feedback controller objects FCO for various feedback controller functions;

command variable objects CVO as command variable generators, which execute movement commands;

program processing objects PPO for running predeterminable user programs;

driver objects DRO for adapting the control at interfaces of the various hardware modules;

system manager objects SMO as an interface with respect to the operating system; and run-up objects BOO (boot objects) for storing the executable of the MCA and for organizing the system startup.

All the basic objects BO, apart from the system manager objects SMO and some driver objects DRO, can be instantiated from "outside," meaning by a project engineer or developer. The basic objects BO themselves exist in the controller as firmware of the RS.

Among the basic objects BO, a distinction is drawn between user-configurable functional objects and necessary system objects. User-configurable functional objects are, in this exemplary embodiment, the feedback controller objects FCO, the command variable objects CVO, the program processing objects PPO, some driver objects DRO and a RS-wide exclusive run-up object BOO. Necessary system objects on the other hand are the system manager objects SMO and special driver objects DRO.

Functional objects FCO, CVO and PPO are typical objects for the project planning of a control solution according to the requirements of the specific application. Necessary system objects SMO, DRO are created and interconnected for network access on a system module SB during the startup of the firmware and cannot be instanced from "outside." Consequently, access to each item of hardware HW is ensured.

An MC application MCA is achieved by interconnection, configuration and user programming of basic objects, in the case of PPOs. Preconfigured BO groups can be formed and/or processed in the ES. Consequently, a macro formation takes place in the form of application modules AM on the user level.

The interconnection of the basic objects BO is basically configured from "outside" by means of the ES and is stored in the executable. The actual interconnection is established on the basis of this information, contained in the executable, by the BOO or the ES.

The interconnection of the basic objects BO takes place via interfaces provided for this purpose at the BOs. These interfaces can be uniquely addressed in the RS and ES. A distinction is drawn between optional and non-optional interfaces. Non-optional interfaces serve for general system functions such as the reception of configuration data, the exchange of variables or for debugging and tracing purposes. Optional interfaces represent functional specifics of a BO to the "outside."

The ES uses for the representation of BO types or instances in the RS substitute objects or instances as a dual representation. These substitute objects provide the ES with information on the properties of BOs and (in the case of active RS access) access to the BOs and their interfaces in the RS. These relationships are represented in FIG. 4.

Figure 4:
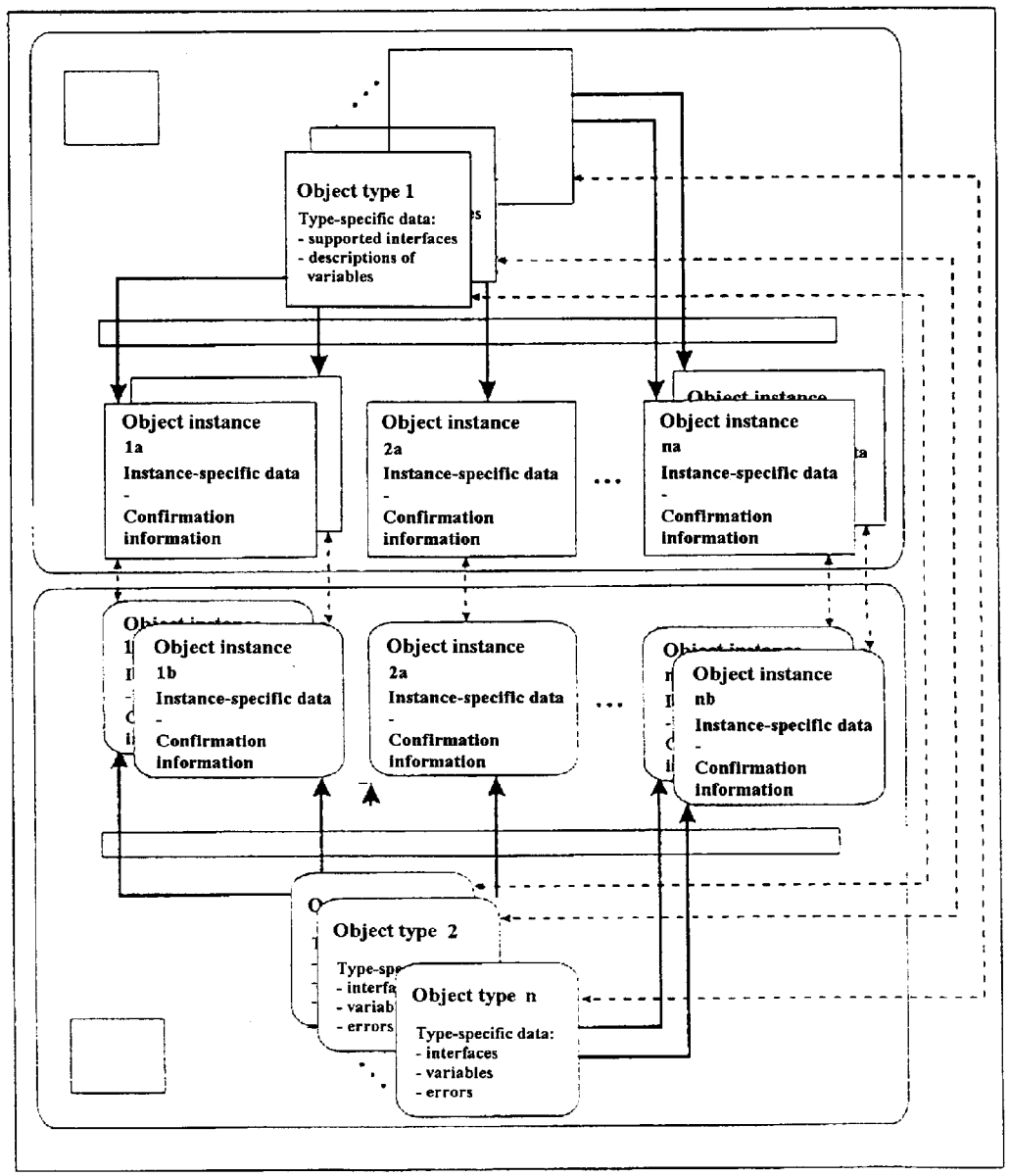
FIG. 4 illustrates an object model in accordance with an exemplary embodiment of the present invention.

Referring to FIG. 4 which shows the interfaces in the engineering system (ES interfaces), all the basic object classes have, as non-optional ES interfaces, command and configuration interfaces, separation being possible if required. Further, optional ES interfaces are variable interfaces, debugging interfaces or tracing interfaces.

Figure 5:
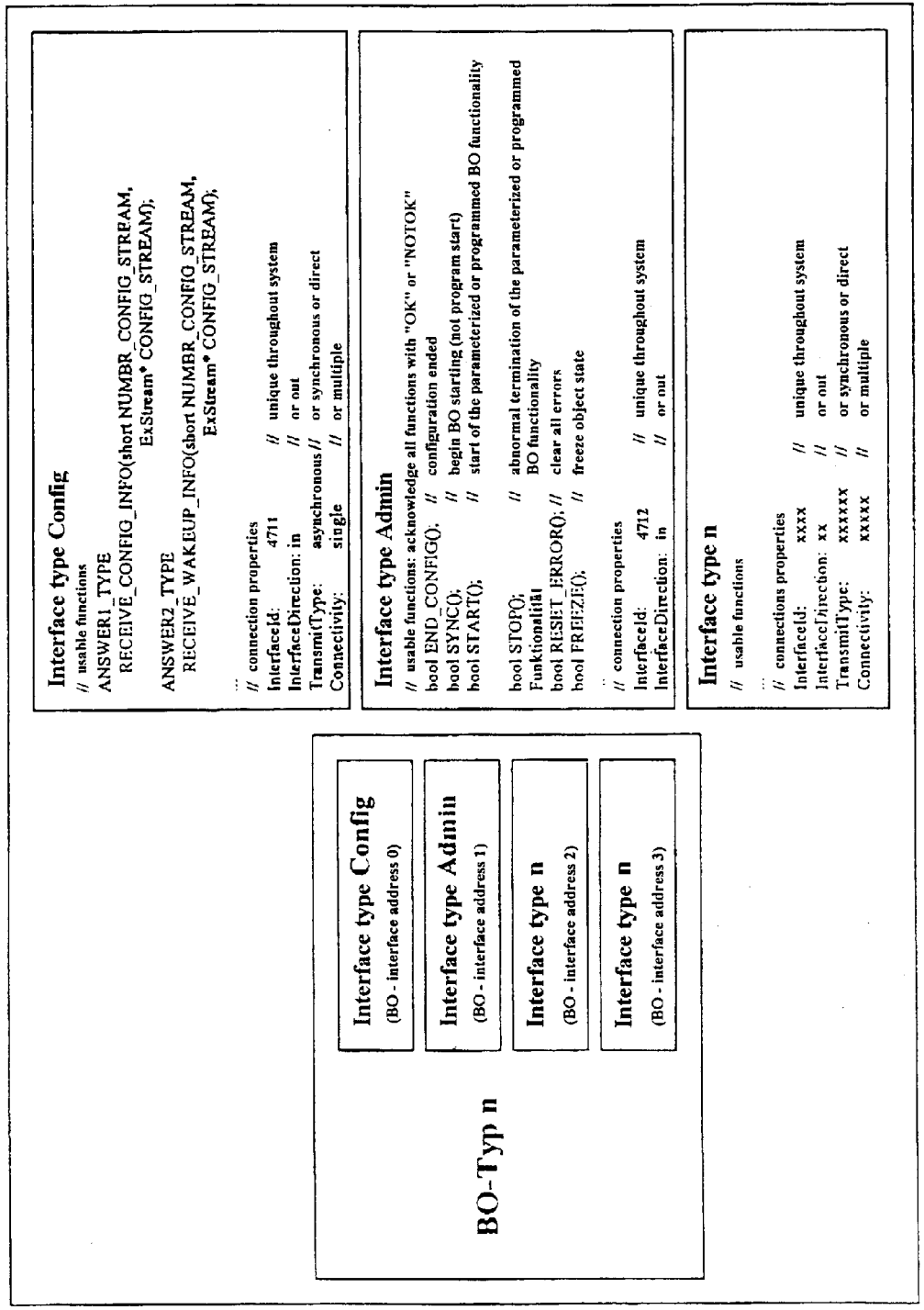
FIG. 5 illustrates interface definitions in accordance with an exemplary embodiment of the present invention.

In FIG. 5 object interfaces are described, the following matching rules (all AND-linked) being used for the linking of two interfaces. Linking is carried out if: the interface IDs are the same; the interface directions are complementary to each other; the transmit type is the same; and the connectivity also allows it.

Interfaces in the runtime system RS (RS interfaces) are fixed in the movement control runtime system directly. The interfaces are managed and addressed in the engineering system ES via type codes, so that their interconnection is possible.

For the interconnection of the basic objects BO to form an actual controller, the engineering system ES is provided, running on a personal computer/programming unit, operating offline and having access to images of all the basic objects BO. In an individual case, the interconnection of the basic objects BO may alternatively also be performed via an "internal" run-up object BOO.

With the aid of the engineering system ES, the actual control solution is programmed and implemented, using corresponding tools. The interconnection and configuration of the basic objects BO produces application modules SAM with specific functionality, corresponding to the hardware modules (single-axis module, multi-axis module, etc.).

The execution of an actually planned software structure takes place in the runtime system RS.

Figure 2:
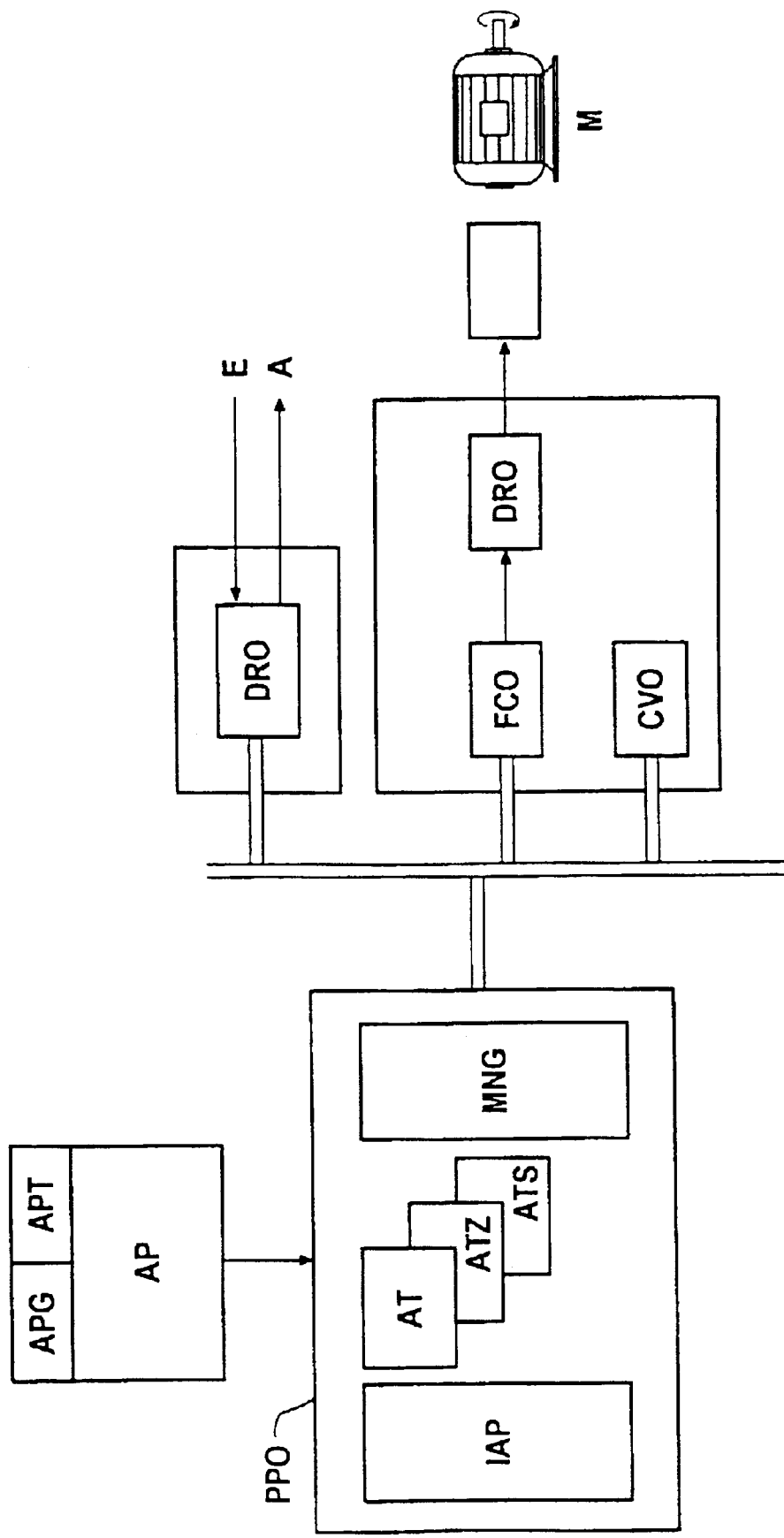
FIG. 2 illustrates a detailed view of a component of an MC application with a program processing object and a hardware link via corresponding driver objects in accordance with an exemplary embodiment of the present invention.

The most important basic objects BO are the feedback controller objects FCO, the command variable objects CVO and the program processing objects PPO, these objects being presented in more detail below with reference to FIG. 2, beginning with the program processing object PPO.

A program processing object PPO is primarily a virtual machine capable of running a user program AP. The program processing object PPO comprises all the functions for executing a command sequence in a temporal multitasking context. The respective user program AP is stored in a special assembler coding MCASM of the virtual machine, after it has been graphically APG or textually APT created on the engineering system ES, compiled and transferred from the latter to the respective program processing object PPO. The access to the BO and operating system functionalities is consequently realized by the set of commands of the virtual machine.

For an MC application MCA, the respective control programs are written and created directly in the manner of a number of tasks. For running the respective control program, tasks AT, ATZ, ATS are created in the multitasking system by the program processing object PPO. These tasks can be set up for various running modes, a distinction being drawn for example between cyclical running—cyclical task ATZ—corresponding to the mode of operation for example of a stored-program controller, and sequential running—sequential task ATS—for example for the calculation of a movement. At the same time, the tasks can of course influence one another, by the coordination of a sequential movement task ATS arising from a cyclical task ATZ. From these user tasks, AT, ATZ, ATS, further tasks are created via MCASM instructions for using the functions of the feedback controller objects FCO, of the command variable objects CVO and/or of the driver objects DRO.

An individual IAP represents an instruction on the MCASM level. An IAP can use PPO-internal and PPO-external interfaces of other BOs or of the operating system to realize its function. The construction and management of PPO-external connections takes place through the MNG. For processing the loaded IAP sequence, which was generated in the ES from the AP, the PPO starts a default ATS in the case of a defined IAP (corresponds to program entry point). IAPs which permit recursive task use exist. For this purpose, there are in the set of MCASM commands, for example IAPs, which permit the generation of a new ATS or ATZ and their starting from a specific IAP within the IAP sequence.

Apart from standard operations of a computer, input/output functions and special functions, which would otherwise be provided, for example, by a stored-program controller, functions for the calculation of movements and for feedback control are required. These higher functions provide the command variable objects CVO and feedback controller objects FCO.

A program processing object PPO is primarily a virtual machine capable of running IAP sequences. An individual IAP represents an instruction on the MCASM level. It forms the programmable access of the user to the functionalities of the BOs and of the operating system. The generation and transfer of the IAP sequences takes place in the steps:

generation of an AP by textual (APT) or graphic (APG) means in the ES;

compilation of the AP in IAP sequences (system-specific coding; MCASM) of the virtual machine of the PPO in the ES and storing in an executable file; and transfer of the IAP sequences from the executable to the respective PPO through the ES or a BOO.

An IAP can use PPO-internal and PPO-external interfaces of other BOs or of the operating system to realize its function. The construction and management of these connections takes place through the MNG.

The functionalities accessible via IAPs are divided into: "user multitasking," in which case, new tasks with cyclical (ATZ) or sequential (ATS) IAP processing on the loaded IAP sequence can be generated, destroyed and influenced, the IAPs defined for this use functionalities of the operating system for this purpose; "processing of standard data types" (numbers, structured data types etc.); and I/O operations for access to special functionalities with PPO-connected BOs, such as CVO for movement generation or FCO for feedback control.

The running of the PPO program is started at the command of the ES or BOO via the command interface of the latter. For this purpose, a default ATS is started in the PPO, beginning its work with a defined IAP (corresponds to program entry point) of the loaded IAP sequence.

To operate physical units M by means of an axial interface or an input/output interface via the actual control hardware of the system module SB, driver objects DRO are classified. DROs serve for decoupling object interfaces from the actual hardware, and implement specific details for the driving. In the exemplary embodiment, in accordance with FIG. 2, a feedback controller object FCO, a driver object DRO and a command variable object CVO are used for the driving of the motor M. The default value of the feedback controller objects FCO serves via the driver object DRO directly for the driving of the motor M. The command variable object CVO, which is interconnected with the feedback controller object FCO (not illustrated), supplies at least the command variable for the rotational speed of the motor M, which is kept constant by means of the feedback controller object FCO, in this exemplary embodiment. Furthermore, a driver object DRO is also provided for input functions E, with which process states can be registered, and output functions A, for example, for switching on specific process components.

Figure 3:
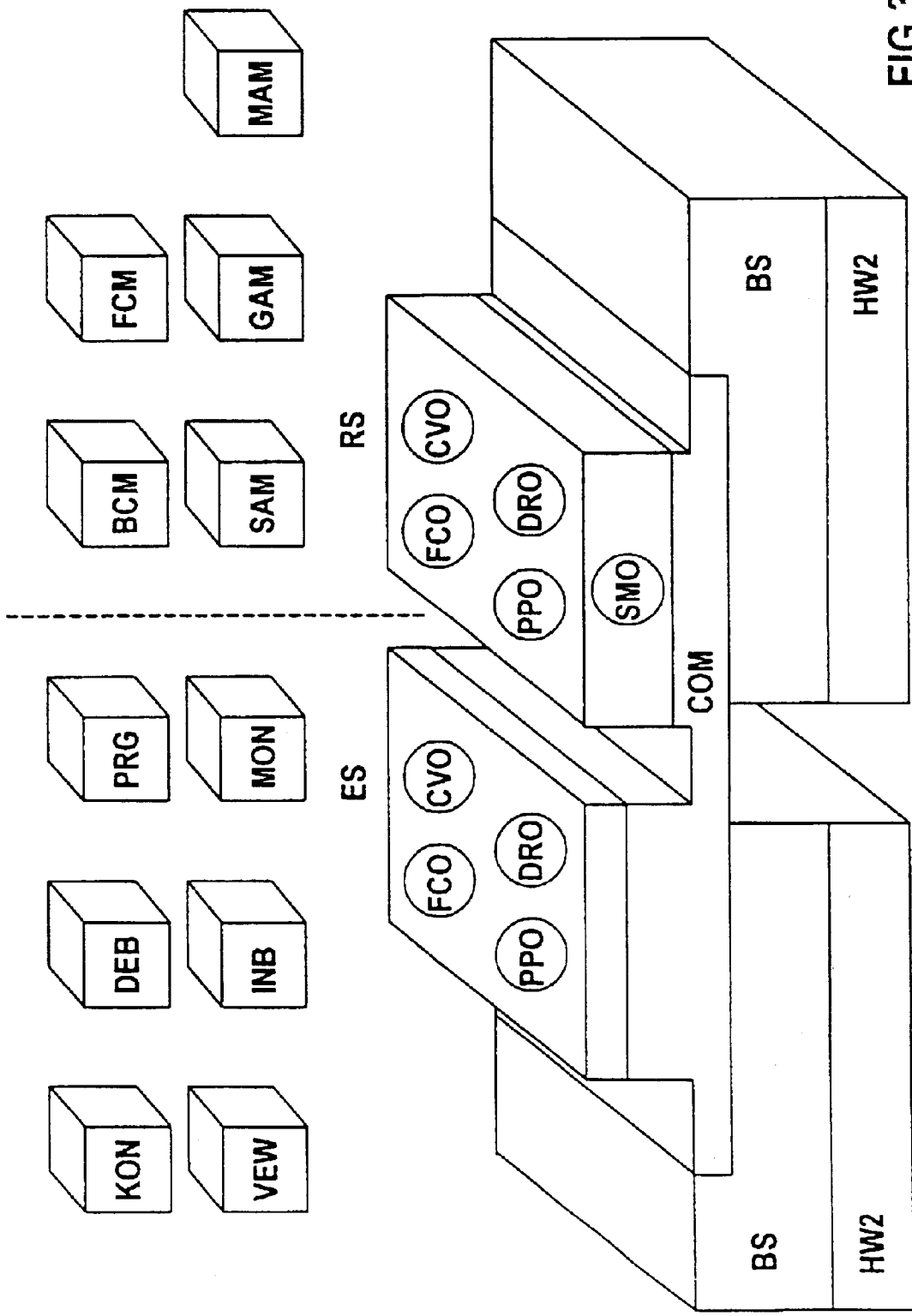
FIG. 3 illustrates a schematic representation of the development environment for the project planning or programming of the MC application on an engineering system and for the running of the planned/programmed MC application on a runtime system in accordance with an exemplary embodiment of the present invention.

The possibilities with regard to configuration, programming, commissioning etc. are presented below with reference to FIG. 3.

In the engineering system ES, an actual control solution corresponding to the respective requirements of the client is configured and programmed using corresponding tools VEW, KON, PRG (management, configuration, programming), the commissioning being supported by further tools INB, MON, DEB (commissioning, monitoring, debugging). The execution of an actually planned software structure with the associated user program takes place in the runtime system RS.

The engineering system ES accordingly permits the handling of a movement control application (MC application) MCA in engineering terms and, in addition, also the representation of the runtime system RS during the engineering (from project planning through to commissioning).

For this purpose, the engineering system ES has access to an image of all the basic objects BO that are executable in the runtime system RS. Accordingly, at least the aforementioned feedback controller objects FCO, command variable objects CVO, program processing objects PPO, driver objects DRO and system manager objects SMO are provided as basic object classes.

Both in the engineering system ES and in the runtime system RS there exists, via the hardware HW-(programming unit or personal computer HW1 for the engineering system ES, control hardware HW2 for the runtime system RS), a complete runtime system with an operating system BS, tools for system management and basic objects BO.

The advantage of the present invention is that the technical process to be automated can be handled with increased functionality, for example, with regard to logic, movement, feedback control and measurement, increased dynamics, in particular, by corresponding adaptation via suitable hardware selection and a flexible structure, for example, as a stand-alone solution, central solution or decentralized or distributed solution.

For the logical sequences, movement operations or feedback control actions, basic elements or basic functions are available. The basic elements are in this case connectable components, the basic objects BO, which represent the basic components for automation tasks with in each case uniform interfaces. The basic functions are available within the framework of programmable functions, it being possible to use a basic set of commands for logic, movement (single axis, loose and close master-slave coupling, geometry network) and feedback control. The structure permits free programmability and flexible adaptation to the circumstances of the respective automation project by instantiating and connecting the respective objects.

The overall system comprises a combination of a runtime system, with a control core as a distributable control operating system, and an engineering system, which permits the graphic programming of the automation project via a corresponding interface.

This structure allows for a natural approach to the automation of technical processes, that is a step-by-step approach which begins with the definition of the respective functions, from which logical dependencies of individual functions or groups of functions arise or can be derived, and only becomes concerned with actual movement operations and feedback control actions possibly required for them when it pays attention to detailed considerations.

This makes it possible to use a unit based on a progressive processing principle, and at the same time offers considerable flexibility in system design.

In addition, in accordance with this exemplary embodiment of the present invention, a controller can be used for a packaging machine with five axes in the main area, a temperature controller and a 3-axes handling system.

Figure 6:
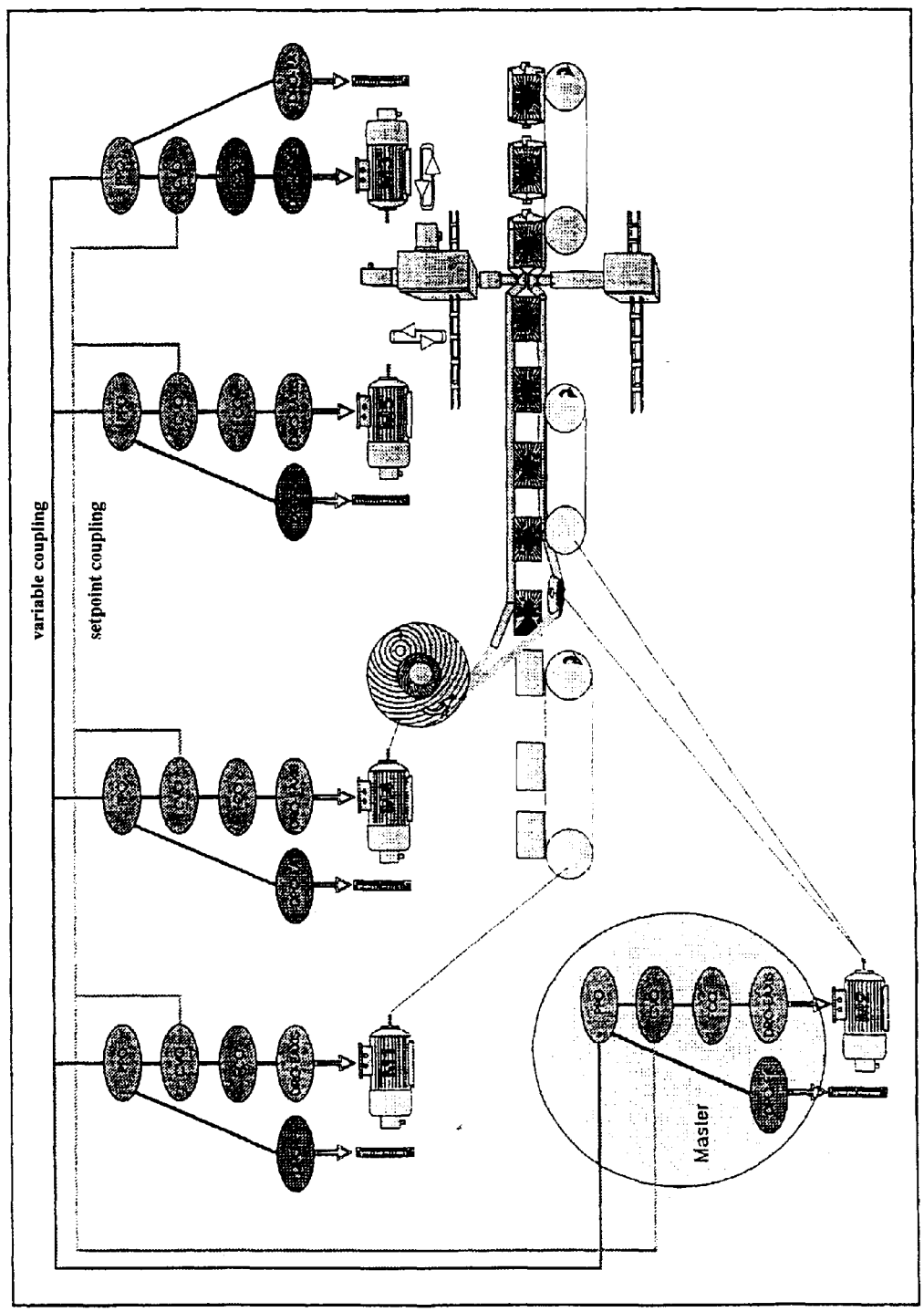
FIG. 6 illustrates an object structure of a tubular-bag machine in accordance with an exemplary embodiment of the present invention.

Reference is made below to FIG. 6, in which an object structure of a tubular-bag machine is shown, the following procedure being realized:

M1: product feeding path:
product length constant or alternatively product spacing constant;
product length tolerance . . . −20%; intended to lead to comparatively equal packaging length tolerance and save packaging film;
product spacing is variable (both too close and too far apart); intended not to influence the packaging length of the product.

M2: longitudinal seam sealing station (master drive):
continuous movement;
film takeoff frequently also by means of this drive;
working tools (heated sealing rollers) are removed from working position when installation is at a standstill by means of control signals from stored-program controller.

M3: transverse sealing station X direction:
sequence of movements:
synchronizing to fixed point of the packaging strand (midway between two products);
synchronous running to the fixed point;
de-synchronizing, movement reversal;
return movement;
end of cycle, standstill (not compulsory).
synchronizing point calculated by means of previously determined product length and set of formulae of the user, stored in the user program and parameterizable via product settings;
"secondary movements" (de-synchronizing curve, return travel) adapted to the speed level of the master axis.

M4: film roller drive:
movement requirements of a winding drive (central winder);
diameter registration and evaluation;
use of smooth film, for example;
register control marks in the case of printed film and compensate for differences in delivering via elasticity of the film.

M5: transverse sealing station Y direction:
sequence of movements:
closing of the sealing tool after dynamically optimized function (at present frequently occurring acceleration and braking noises are undesired);
closing noise of the sealing jaws ("slapping") should not occur, but secure contact is required (allegory used "pressing in the last phase of movement");

dynamic adaptation of the closing movement to the elasticity and backlash of the closing mechanism requires adaptation;

adaptation found at present to be strongly speed-dependent (new working point new setting);

additional boundary parameters of the closing profile for film entrainment (additionally acceleration-limited);

dwell time in the closed state;

surging moment via torque control in the dwell time;

opening of the sealing jaws after a second function;

end of cycle; standstill;

movement travel of the sealing jaws dependent on the product height;

linking of the movement profiles for X and Y drive (closing movement already begins before the synchronizing point is reached; the synchronizing begins before complete opening);

the cutting signal is to be coupled to the closing movement (dynamically high-value output; too slow via stored-program controller).

The invention can be briefly described as follows: the movement control system is a programmable control system comprising various hardware modules in a decentralized and flexible form, the hardware modules of which are referred to as system modules.

Due to the diversity of the requirements to be met for controlling the movement of production machines, the system is based on a range of hardware modules, which are provided with adequate computing capacity, a real-time operating system and specific basic functionality, a network (for example, Profibus) for constructing a decentralized system with distributed control functionality and also operating and monitoring units with planned interfaces. The present invention proposes a configurable, distributable and programmable control software system for individually adapting the control solution to the client's requirements, with which the planned control solution is distributed among hardware modules and in which an engineering system, for example running on a programming unit or personal computer, is used for management, configuration, programming, monitoring, debugging and commissioning.

Although the present invention has been described in detail with reference to specific exemplary embodiments thereof, various modifications, alterations and adaptations may be made by those skilled in the art without departing from the spirit and scope of the invention. It is intended that the invention be limited only by the appended claims.

What is claimed is:

1. A method for project planning and/or programming of a software application for controlling and/or monitoring a technical process, said method comprising:

using a plurality of instantiatable basic object types of said software application, said instantiatable basic objects comprising at least feedback controller objects for various feedback controller functions, command variable objects as command variable generators, program processing objects for running predeterminable user programs, driver objects for adapting control at interfaces of the various hardware modules and system manager objects as an interface with respect to the operating system, and/or run-up objects for storing the executable;

using addressable interfaces for parameterizing and interconnection, said object types being part of a firmware of a runtime system; and at least one program processing object type and at least one driver object type being provided as said instantiatable basic object type, said at least one program processing object type processing a user-definable program and said driver object type driving process hardware.

2. The method as claimed in claim 1, wherein said project planning comprises at least the steps of selecting, parameterizing and interconnecting said basic objects.

3. The method as claimed in claim 1, wherein said at least one program processing object type is provided as a virtual machine as an instantiatable basic object type, said at least one program processing object type being capable of running IAP sequences.

4. The method as claimed in claim 1, wherein at least one of said command variable objects is provided as an instantiatable basic object type, said at least one command variable object type for predetermining a command variable for a subcomponent of the external technical process.

5. The method as claimed in claim 1, wherein said at least one feedback controller object is provided as an instantiatable basic object type, said at least one feedback controller object for controlling a subcomponent of the external technical process.

6. The method as claimed in claims 1, wherein said project planning is implemented on an engineering system and wherein said software application is executed on a runtime system.

7. The method as claimed in claim 5, wherein each of said basic object types has an image in an engineering system.

8. A method of controlling and/or monitoring technical processes wherein the controlling and/or monitoring takes place by means of a software application planned and/or programmed by a method according to claim 1.

* * * * *